US008711210B2

(12) United States Patent
Manson et al.

(10) Patent No.: US 8,711,210 B2
(45) Date of Patent: Apr. 29, 2014

(54) FACIAL RECOGNITION USING A SPHERICITY METRIC

(75) Inventors: Steven J. Manson, Tucson, AZ (US); Tara L. Trumbull, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 657 days.

(21) Appl. No.: 12/967,641

(22) Filed: Dec. 14, 2010

(65) Prior Publication Data

US 2012/0147167 A1 Jun. 14, 2012

(51) Int. Cl.
*H04N 9/47* (2006.01)

(52) U.S. Cl.
USPC ............................................ 348/77; 382/276

(58) Field of Classification Search
USPC ................................... 348/77; 382/278–308
See application file for complete search history.

(56) References Cited

U.S. PATENT DOCUMENTS

| | | | |
|---|---|---|---|
| 5,886,702 A * | 3/1999 | Migdal et al. ................. | 345/423 |
| 6,628,805 B1 | 9/2003 | Hansen et al. | |
| 6,959,119 B2 | 10/2005 | Hawkins et al. | |
| 7,162,063 B1 | 1/2007 | Craine et al. | |
| 7,337,154 B2 | 2/2008 | Manson | |
| 2004/0012638 A1 | 1/2004 | Donnelli et al. | |
| 2004/0093166 A1 | 5/2004 | Kil | |
| 2004/0175039 A1 | 9/2004 | Miller | |
| 2005/0232474 A1 | 10/2005 | Wei et al. | |
| 2006/0002632 A1 | 1/2006 | Fu et al. | |
| 2006/0227385 A1 | 10/2006 | Kawada | |
| 2007/0046662 A1 * | 3/2007 | Kawakami et al. ........... | 345/419 |
| 2007/0064989 A1 | 3/2007 | Chhibber et al. | |
| 2007/0080967 A1 | 4/2007 | Miller | |
| 2009/0304243 A1 | 12/2009 | Mertz et al. | |
| 2009/0327890 A1 | 12/2009 | Mertz et al. | |

FOREIGN PATENT DOCUMENTS

| | | |
|---|---|---|
| WO | WO 99/27838 | 6/1999 |
| WO | 2009148596 A1 | 12/2009 |
| WO | 2009158001 A1 | 12/2009 |

OTHER PUBLICATIONS

Manson, Steven J. "Threat Object Map Creation Using a Three-Dimensional Sphericity Metric," U.S. Appl. No. 12/467,750, filed May 18, 2009.
Manson, Steven J. "Image Registration System and Method for Registering Images for Deformable Surfaces," U.S. Appl. No. 12/943,156, filed Nov. 10, 2010.
"International Search Report and Written Opinion," International Application No. PCT/US2009/003386, mailed Aug. 4, 2009.
"International Search Report and Written Opinion," International Application No. PCT/US2009/003773, mailed Aug. 12, 2009.

(Continued)

*Primary Examiner* — Anner Holder
(74) *Attorney, Agent, or Firm* — Daly, Crowley, Mofford & Durkee, LLP

(57) ABSTRACT

A facial recognition system and a method for performing facial recognition are provided. The facial recognition system includes a memory configured to store a target data set identifying a plurality of predefined points on a face of a target and a processor. The processor may be configured to receive an arbitrary number of photographs including a face of a subject, each of the photographs being at an arbitrary angle and at an arbitrary distance from the subject, create a subject data set identifying the plurality of predefined points on the subject's face based upon the received photographs, and perform facial recognition on the subject data set by comparing the subject data set to the target data set.

25 Claims, 7 Drawing Sheets

(56) References Cited

OTHER PUBLICATIONS

Notification of Transmittal of the International Search Report and the Written Opinion of the International Searching Authority, or the Declaration, PCT/US2011/053093, date of mailing Jan. 23, 2012, 6 pages.

Written Opinion of the International Searching Authority, PCT/US2011/053093, date of mailing Jan. 23, 2012, 13 pages.

Takeo Kanade: "Picture Processing System by Computer Complex and Recognition of Human Faces". Thesis at the University of Kyoto, Japan, Jan. 1, 1973, pp. 1-148, XP55015725, Japan. URL: http://www.ri.cmu.edu/pub_files/pub3/kanade_takeo_1973_1.pdf [retrieved on Jan. 4, 2012].

Soyel H. et al.: "Optimal feature selection for 3D facial expression recognition with geometrically localized facial features", Soft Computing, Computing With Words and Perceptions in System Analysis, Decision and Control, 2009. ICSCCW 2009. Fifth International Conference on, IEEE, Piscataway, NJ, USA, Sep. 2, 2009, pp. 1-4, XP031609165, ISBN: 978-1-4244-3429-9.

Soyel H. et al.: "Facial Expression Recognition Using 3D Facial Feature Distances", Aug. 22, 2007, Image Analysis and Recognition; [Lecture Notes in Computer Science], Springer Berlin Heidelberg, Berlin, Heidelberg, pp. 831-838, XP019067307, ISBN: 978-3-540-74258-6, Section 3.

Tang H. et al.: "3D Facial Expression Recognition Based on Automatically Selected Features", Computer Vision and Pattern Recognition Workshops, 2008. CVPR Workshops 2008. IEEE Computer Society Conference on, IEEE, Piscataway, NJ, USA, Jun. 23, 2008, pp. 1-8, XP031285608, ISBN: 978-1-4244-2339-2.

Bowyer K.W. et al.: "A Survey of Approaches and Challenges in 3D and Multi-modal 3D+2D Face Recognition", Computer Vision and Image Understanding, Academic Press, US, vol. 101, No. 1, Jan. 1, 2006, pp. 1-15, XP024917625, ISSN: 1077-3142, DOI: 10.1016/J.CVIU.2005.05.005 [retrieved on Jan. 1, 2006].

Scheenstra A. et al.: "A Survey of 3D Face Recognition Methods", Jun. 28, 2005, Audio- and Video-Based Biometric Person Authentication; [Lecture Notes in Computer Science; LNCS], Springer-Verlag, Berlin/Heidelberg, pp. 891-899, XP019013352, ISBN: 978-3-540-27887-0.

Notification Concerning Transmittal of International Preliminary Report on Patentability (Chapter I of the Patent Cooperation Treaty) dated Jun. 27, 2013, PCT/US2011/053093, 1 page.

International Preliminary Report on Patentability date Jun. 18, 2013, PCT/US2011/053093, 1 page.

Written Opinion of the International Searching Authority, PCT/US2011/053093 Jan. 23, 2102, 11 pages.

\* cited by examiner

FACIAL RECOGNITION USING A SPHERICITY METRIC

TECHNICAL FIELD

Embodiments of the subject matter described herein relate generally to facial recognition systems and methods, and more particularly to using multiple two-dimensional images to composite three-dimensional point features, and to using a sphericity metric to compare a subject's face to a target's face.

BACKGROUND

Current facial recognition techniques require large amounts of processing power to compare a subject's face to a target's face. Furthermore, current facial recognition techniques are vulnerable, for example, to changes in lighting and differences in angles and distances between a subject and photographs of targets the subject is being compared to. Further still, current facial recognition techniques require large amounts of data to be stored for each target.

Accordingly, there is a need for improved systems and methods for performing facial recognition. Other desirable features and characteristics will become apparent from the subsequent detailed description and the appended claims, taken in conjunction with the accompanying drawings and the foregoing technical field and background.

BRIEF SUMMARY

In accordance with one embodiment, a facial recognition system is provided. The facial recognition system includes a memory configured to store a target data set identifying a plurality of predefined points on a face of a target and a processor. The processor may be configured to receive an arbitrary number of photographs including a face of a subject, each of the photographs being at an arbitrary angle and at an arbitrary distance from the subject, create a subject data set identifying the plurality of predefined points on the subject's face based upon the received photographs, and perform facial recognition on the subject data set by comparing the subject data set to the target data set.

A method for performing facial recognition is also provided. The method includes receiving, by a processor, photographic data from an arbitrary number of photographs including a face of a subject, each of the photographs being at an arbitrary angle and at an arbitrary distance from the subject, creating, by the processor, a subject data set identifying the plurality of predefined points on the subject's face based upon the received photographic data, and comparing, by the processor, the subject data set to a target data set stored in a memory.

In accordance with another embodiment, an apparatus is provided. The apparatus may include a camera configured to take at least one photograph of a target, the photograph being taken at any arbitrary angle relative to the subject and at any arbitrary distance from the subject, a memory configured to store the at least one photograph and further configured to store a database including facial recognition data for at least one target identifying a predetermined number of points on the target's face and a processor. The processor may be configured to create a subject data set by analyzing the at least one photograph to determine the location of the predefined points on the subject's face, and compare the subject data set to the target data set stored in the memory.

BRIEF DESCRIPTION OF THE DRAWINGS

A more complete understanding of the embodiments may be derived by referring to the detailed description and claims when considered in conjunction with the following figures, wherein like reference numbers refer to similar elements throughout the figures.

DETAILED DESCRIPTION OF THE DRAWINGS

The following discussion generally relates to methods, systems, and apparatus for the use of a three-dimensional ensemble sphericity measure to perform facial recognition wherein subjects (photographed as opportunities arise) are compared to an enrolled database of targets (e.g. known bad guys). In that regard, the following detailed description is merely illustrative in nature and is not intended to limit the embodiments or the application and uses thereof. Furthermore, there is no intention to be bound by any expressed or implied theory presented in the preceding technical field, background, brief summary, or the following detailed description.

Figure 1:
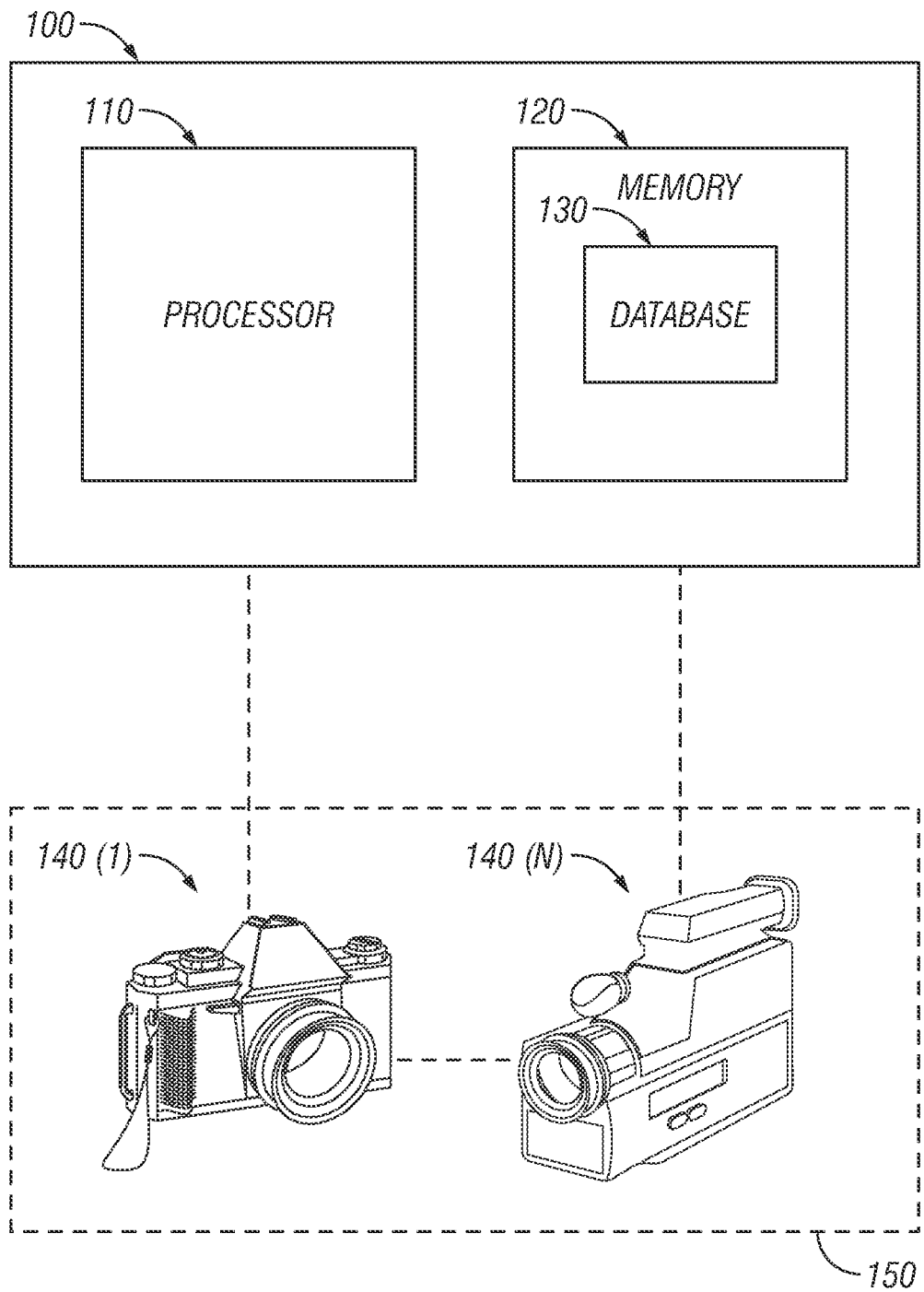
FIG. 1 illustrates a facial recognition system in accordance with an embodiment.

FIG. 1 illustrates a facial recognition system 100 in accordance with an exemplary embodiment. The facial recognition system 100 includes a processor 110 and a memory 120. The processor 110 may be a computer processing unit ("CPU"), a graphical processing unit ("GPU"), an application specific integrated circuit ("ASIC"), a field programmable gate array ("FPGA"), a micro-controller, or any other logic device. The memory 120 may be any type of memory. For example, the memory 120 may be a computer-readable memory.

The memory 120 includes a database 130. The database 130 may include a data set for multiple targets that the facial recognition system is trying to identify. In other embodiments the database 130 may be separate from the facial recognition system 100 and may be accessed by the facial recognition system, for example, through a network connection.

The facial recognition system 100 may also include a camera system 150. The camera system 150 may have N number of cameras 140(1) to 140(N) in any combination of still cameras and video cameras which may be placed at any arbitrary angle and distance respective to each other and to a subject. The camera and video cameras within the camera system 150 may be in communication with each other and/or in communication with the facial recognition system 100. In another embodiment, the facial recognition system 100 may also include only a single camera 140(1).

In another embodiment a camera 140(1) or multiple cameras 140(1) to 140(N) may be separate from the facial recognition system. In this embodiment, photographic data from the camera 140(1) or multiple cameras 140(1) to 140(N) may be input to the facial recognition system 100. For example, the photographic data may be transmitted to the facial recognition system via a network connection (not shown), input to the facial recognition system using any computer-readable memory or scanned in using a scanner in communication with the facial recognition system 100.

The operation of the facial recognition system 100 will be described in further detail with reference to FIGS. 2-6.

Figure 2:
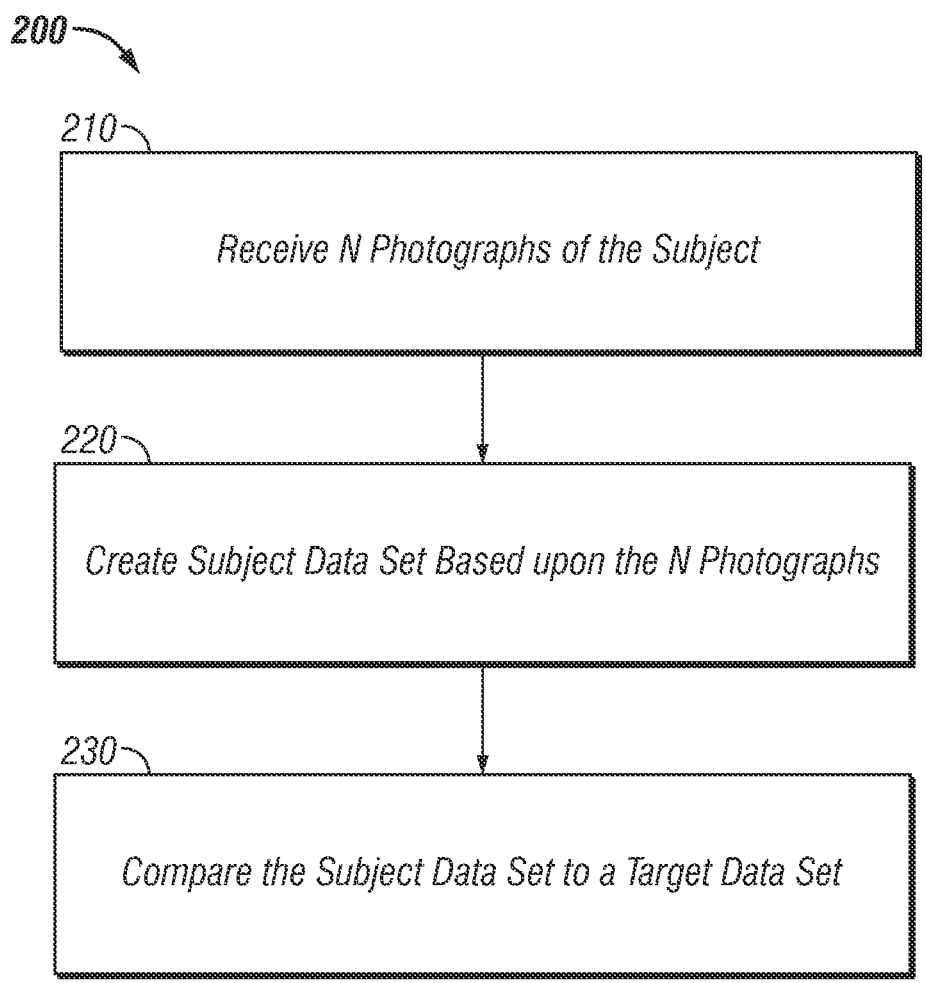
FIG. 2 illustrates a method of performing facial recognition in accordance with an embodiment.

FIG. 2 illustrates a method 200 for performing facial recognition in accordance with an embodiment. The method 200 includes receiving M number of photographs or sets of photographic data of the subject. (Step 210). As discussed above, the photographs may be taken by a still camera or may be captured from a video camera. The number of photographs M is preferably greater than or equal to 2, however, if only 1 photograph is available, the facial recognition process can still be accomplished as discussed in further detail below. When multiple photographs of the subject are available, a more accurate data set can be extracted from the photographs. As discussed above, the photograph or photographs can be taken at any angle and at any lighting condition.

Figure 3:
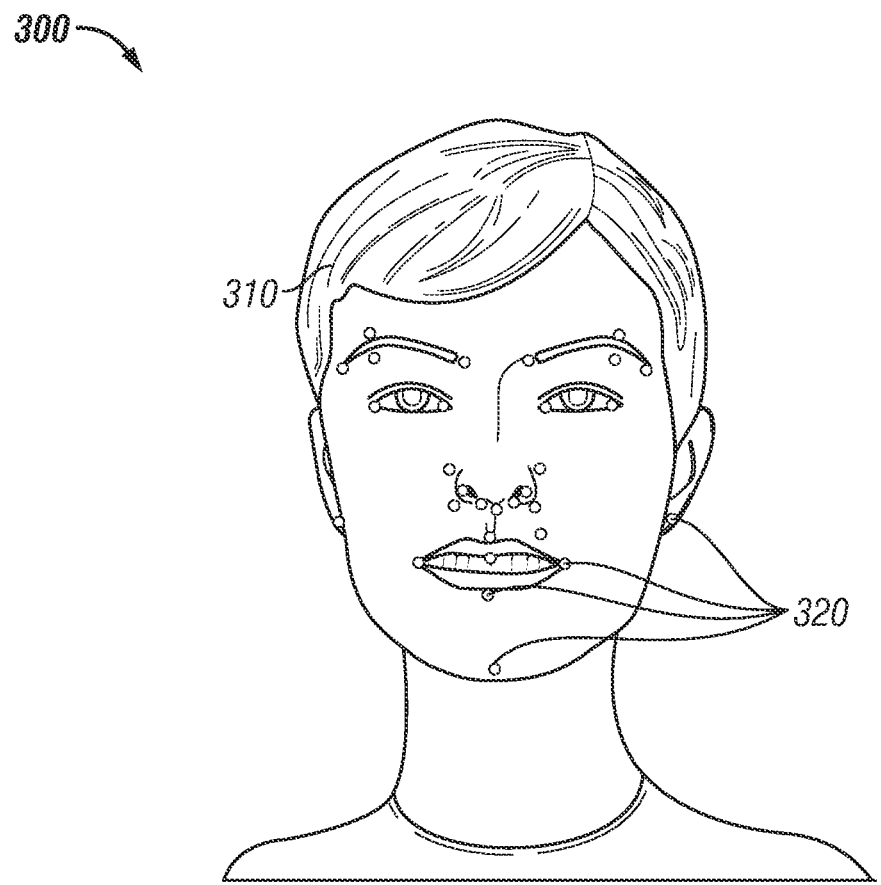
FIG. 3 illustrates a subject and an exemplary set of points which may be identified on the subject's face.

FIG. 3 illustrates a photograph 300 taken of a subject 310. The photograph 300 includes a series of exemplary points 320 which may be identified on the subject. For example, the points may include, but are not limited to, points related to the chin, lips, eyes, ears, nose, nostrils, eyebrows, teeth, forehead, cheeks, neck, skin, and hairline.

Some of the predetermined points 320 may be fixed relative to other points. For example, a position of a tooth on the upper jaw of the subject and a corner of an eye are relatively fixed to each other. Some of the predetermined points may also have a variable position. For example, the relative position of the lower jaw with respect to an eyebrow may depend upon the subject's facial expression. In one embodiment, the points which are fixed relative to other points may be assigned a higher weight than points which are more variable relative to other points. Points which are assigned a higher weight may, for example, be given a greater consideration during the facial recognition process, as discussed in greater detail below.

The points which may be identified on the photograph will depend upon the angle of the photograph. For example, a photograph depicting a profile of the left side of a subject's face would not include any identifiable points corresponding to the right side of the subject's face. Furthermore, objects, such as scarves, glasses, hats, or other head coverings may obscure portions of the subject's face and would affect which data points are available for extraction.

Returning to FIG. 2, each of the M photographs received by the processor 110 are then analyzed to identify predetermined points on the subject's face. (Step 220). When multiple photographs are used, three-dimensional data can be extracted from the photographs, as described in further detail below.

Figure 4:
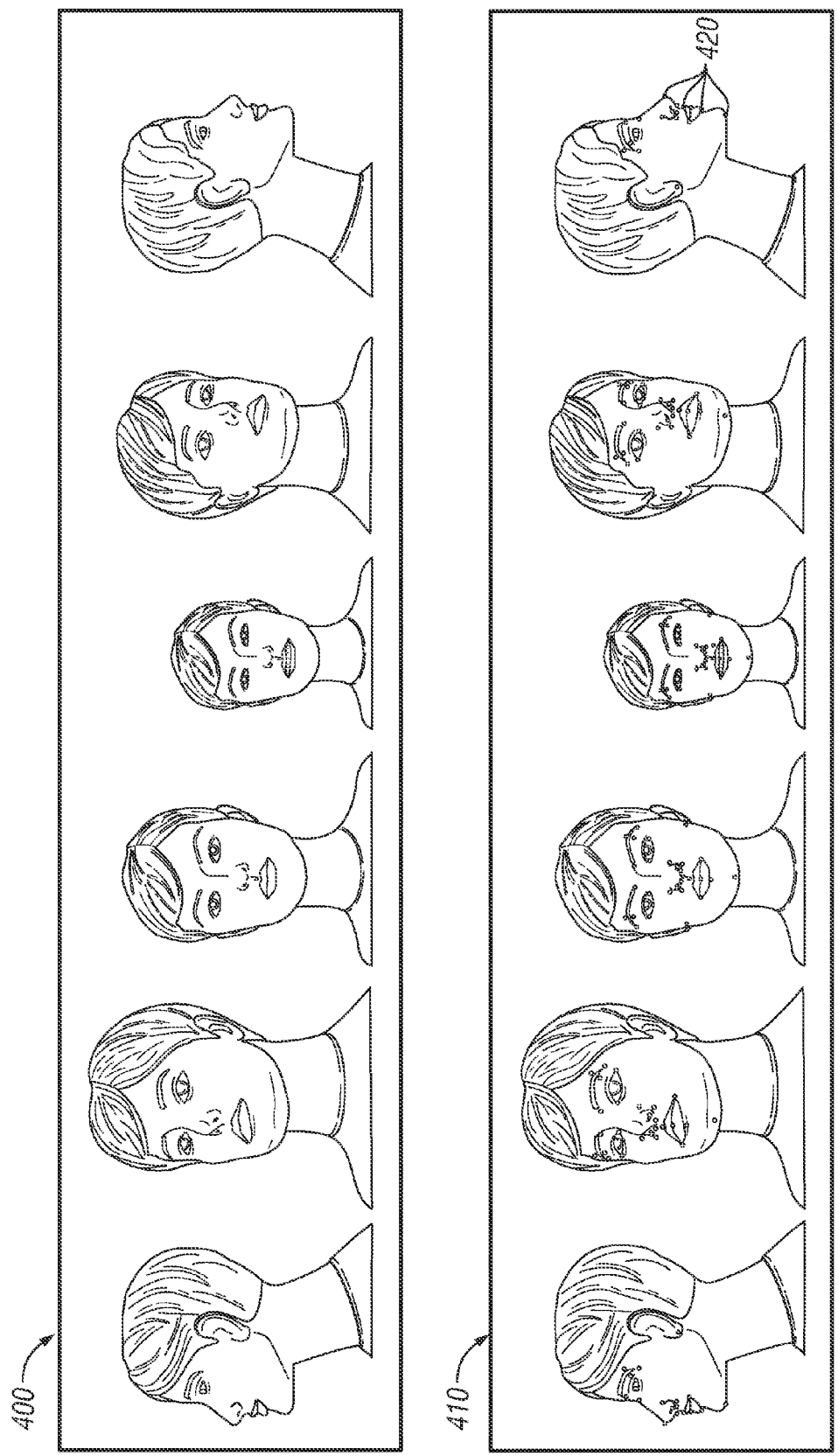
FIG. 4 illustrates a series of photographs of a subject before and after the points are identified on the subject's face.

FIG. 4 illustrates a series of photographs 400 of a subject before processing, and the series of photographs 410 after the predefined points were identified by the processor no. The processor 110 analyzes the photographs 400 and generates a single data set associated with the subject using a three-dimensional compositing process. The single data set includes three-dimensional data points 420 at a plurality of predetermined points on the subject's face, as illustrated in the photograph series 410. As discussed above, the points 420 illustrated in the photographic series 410 are merely at exemplary locations; other locations and a varying number of points on the subject's face may also be used. While the photographic series 410 includes five photographs of the subject, any arbitrary number of photographs may be used. As seen in FIG. 4, the photographs may be on any arbitrary angle of the subject 410 face. Further, as see in FIG. 4, each of the photographs 400 illustrated in FIG. 4 may be taken at any arbitrary distance relative to the subject 410.

In one embodiment the processor 110 may use, for example, a differential genetic algorithm to perform the three-dimensional compositing process to generate the single set of data points 420, based upon the photographs 400 input to the system. Genetic algorithms belong to the larger class of evolutionary algorithms (EA), which generate solutions to optimization problems using techniques inspired by natural evolution, such as inheritance, mutation, selection, and crossover.

The following step makes reference to a three-dimensional canonical facial point data set. The canonical facial point data set is a priori data wherein each predetermined facial point is assigned a nominal location in three-dimensional space that corresponds to a typical arrangement of such points on an average human face. This canonical data may be used to convey to the algorithm the weight set for the facial data points as well. For example, a point on the subject's chin may have a low weight due to the variability introduced by the fact that the picture may depict the subject's mouth either open or closed. The canonical facial point data should include any point features used to do facial recognition as implemented by any variation of the subject method, so long as those features have a reasonably consistent arrangement (as do feature points related specifically to eyes, ears, mouth, nose, etc) from face to face and are not highly variable with respect to location (as are features such as moles, dimples, and so forth). This canonical facial point data can also be used to compute an approximate camera position given an individual 2-D point feature set as described in further detail below.

Figure 5:
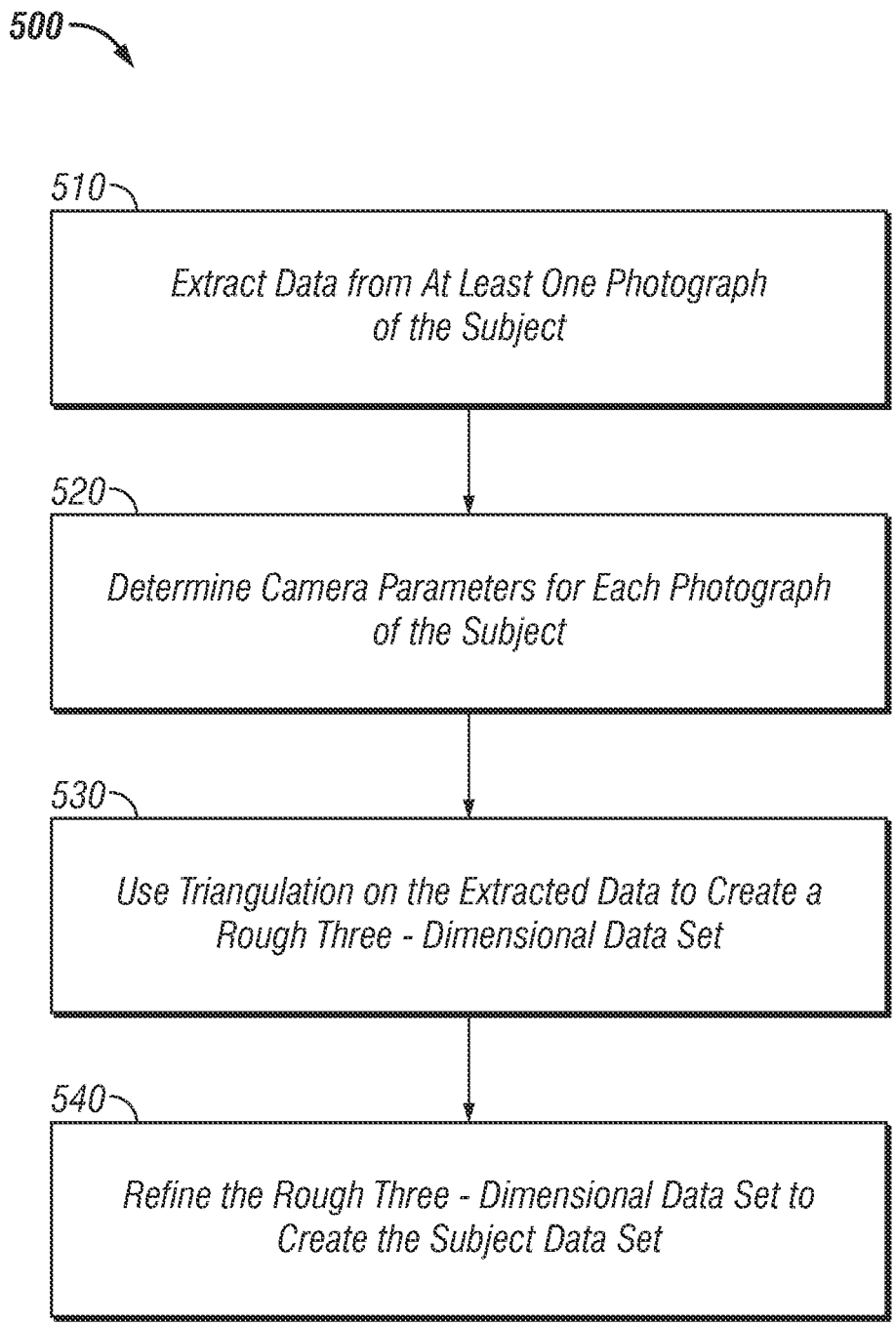
FIG. 5 illustrates a three-dimensional sphericity method useful in understanding an embodiment.

FIG. 5 illustrates the principles of the three-dimensional compositing process 500. The processor no first extracts pixel coordinates for the predefined points on the subject's face from the series of photographs 400. (Step 510). The processor no may then determine candidate camera parameters for each photograph of the subject that minimize an aggregate distance between input points (i.e., the extracted pixel coordinates) and the three-dimensional canonical facial point data. (Step 520). The camera parameters may include, but are not limited to, estimated distance between the camera and the subject, azimuth, elevation, range, roll, instantaneous field of view ("IFOV"), x-offset, and y-offset. The processor 110 may then use triangulation to determine the closest intersection points of camera rays corresponding to image points to create a first rough three-dimensional data set corresponding to the predefined points on the subject's face. (Step 530). In other words, the processor no triangulates an estimated position for each of the predefined points by comparing the position of the pixels extracted from each photo for the respective predefined point and the camera parameters for the respective camera. For example, the processor may determine a line from each camera through the pixel where the predefined point is located. The processor may then, based upon the lines, the location of the respective predefined point along each line and the parameters for each camera, triangulate a rough three-dimensional position for the predefined point.

The processor no then refines the rough three-dimensional data set to create the subject data set 420. (Step 540). The processor no may implement a genetic algorithm to iteratively 1) determine camera parameters and three-dimensional point locations simultaneously; 2) determine 3-D point locations that minimize aggregate image plane errors for all camera views; and 3) determine camera parameters that minimize aggregate distance between input image points and the derived three-dimensional face point data (i.e., the subject data set 420). For example, the 3-D canonical facial point data extracted in step 510 may be scaled, rotated, translated, and refigured with regard to range parallax until an appropriate minimal error is found in the aggregate Cartesian distance between the canonical set and the photo data set. The scaling and other parameters are then held as the first approximation of the camera position that produced the 2-D photo. As a matter of practice, what has been referred to as the camera position also includes camera parameters such as field of view and camera roll and view angles.

The points 420 may be saved in the memory 120. The points 420 may be created and stored relative to any coordinate system. For example, a face-derived coordinate system may be used. The face-derived coordinate system may be based upon, for example, an average face. In one embodiment, the axes in the face-derived coordinate system may be centered on one of the predefined points or an expected position of one of the predefined points on an average face. For example, the face-derived coordinate system may hold the X-direction as that between the two inner eye corners, with the positive X in the direction of the left eye, the Y-direction as the component of the vector from the bridge of the nose to the center of the upper lip that is orthogonal to the X-direction, and with the positive Y-direction in the direction of the forehead. The Z-direction may be computed by taking the cross-product of the X and Y direction vectors, such that the positive Z-direction points in the general direction of the nose. The origin is defined to be at the tip of the nose, and the scale factor is such that the distance between the two inner eye points is defined to be two units.

Other types of coordinate systems may be used. For example, an absolute Cartesian system, a cylindrical coordinate system, a spherical coordinate system or a camera oriented coordinate system can be used.

Further, a database of targets may be built using this technique. The memory 120 only needs to store a relatively small amount of data for each subject or target since only a series of three-dimensional points are needed to identify a subject or target. In one embodiment, for example, up to thirty nine points may be identified on each target. Accordingly, the memory 120 would only need to store thirty nine points, at relatively low precision (e.g. three significant figures in the aforementioned face-derived coordinate system) to identify any target. Accordingly, one benefit of the claimed embodiments is, for example, that a large number of targets can be stored in a small amount of memory.

While the performance of the facial recognition system 100 improves when multiple photographs of the subject are available, the processor can also create a data set based upon a single photo. When only a single photograph of the subject is available, the processor 110 creates a two-dimensional data set and performs the facial recognition on the two-dimensional data set as described in further detail below. While this implementation by itself is limited to performing recognition only on images taken from very nearly the same angle, it can be coupled with the 3-D recognition system in the case where target data is available in 3-D, but only a single image of the subject is available. In this embodiment, the 3-D target data can be used in place of the canonical face, and the camera angle derived to reduce spatial errors. The 2-D sphericity measure can then be used as a recognition metric in comparing the 2-D subject points to the best fit of a given target. The inverse application (A single target photo and multiple subject photos) is also a possible implementation. Returning to FIG. 2, the processor 110 then compares the data points 420 of the subject to a target data set stored in the database 130 to determine if there is a match. (Step 230). The processor may implement, for example, a two-dimensional sphericity metric to perform the comparison.

Figure 6:
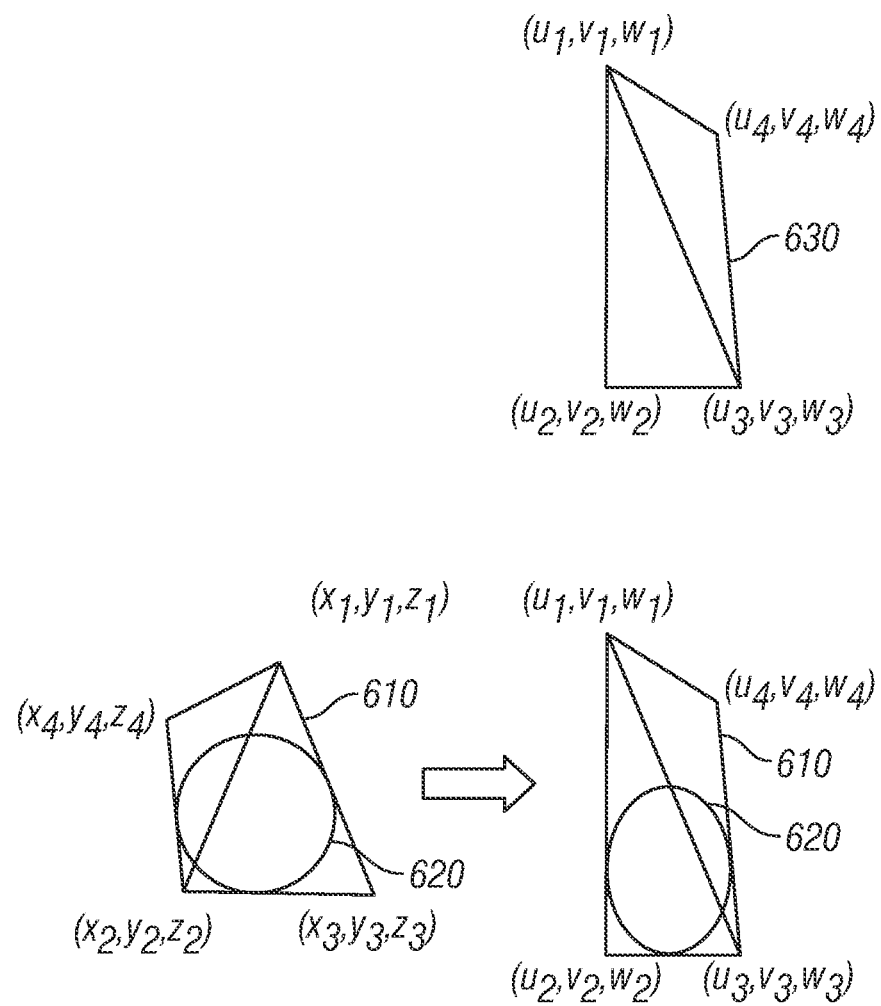
FIGS. 6 and 7 illustrate another method for performing facial recognition in accordance with an embodiment.
Figure 7:
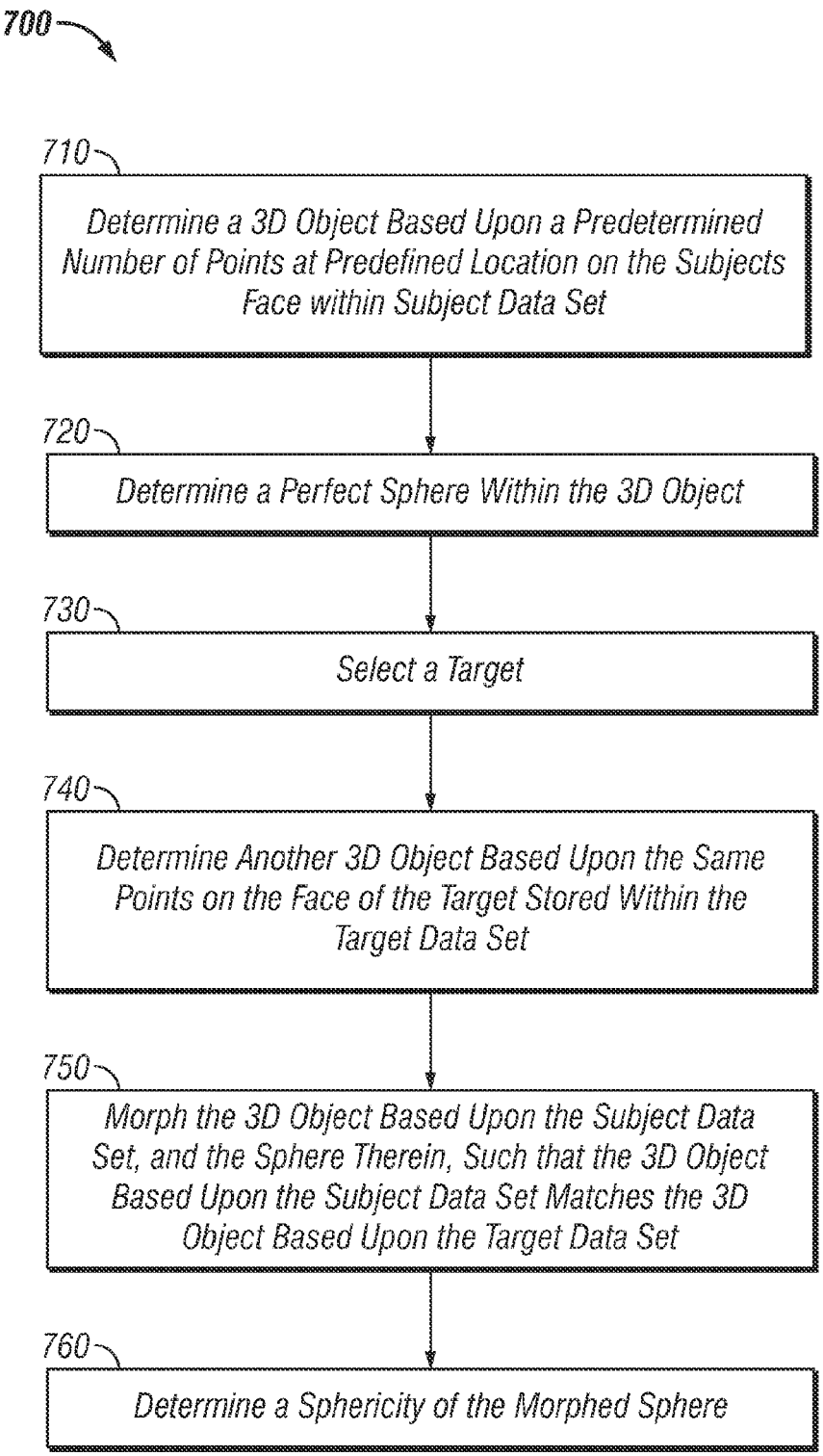

FIGS. 6 and 7 illustrate an exemplary method 600 of a three-dimensional sphericity metric. The processor no determines (i.e., models or creates) a three-dimensional object 610 based upon an arbitrary combination of the data points 420 in the subject data set. (Step 710). The object 610 illustrated in FIG. 6 is a tetrahedron based upon four points in the data set, however, many different polyhedra with varying numbers of points may be used as the basis for the object 610. For example, an n-hedron or n-simplex may be used. A simplex is a generalization of the notion of a triangle or tetrahedron to arbitrary dimension. Similarly, a n-hedron is a generalization of the notation for multi-dimensional hedron. An n-simplex is an n-dimensional polytope which is the convex hull of its n+1 vertices. For example, a 2-simplex is a triangle, a 3-simplex is a tetrahedron, and a 4-simplex is a pentachoron. Generally, the object will have one more point than the number of dimensions. The object 610 preferably has at least two dimensions. In some embodiments the object may have four or more dimensions. For example, a skin color or a texture of the skin may be used as a fourth dimension. The processor then determines a perfect sphere 620 that fits within the object 610 and touches each side of the object 610. (Step 720).

The processor 110 then selects a target data set to compare the subject data set to. (Step 730). The target may be selected, for example, based upon an attribute of the subject as described in further detail below. The processor 110 selects the same points in the target data set to create a target object 630. (Step 740). For example, if the object 610 was created based upon an outer corner of a right eye, an inner corner of a left eye, a tip of a nose, and a lower point on the right ear of the subject, the same points on the targets face are selected to create the target object 630. The processor 110 then remaps the object 610 and the sphere therein such that the points in object 610 match the points in target object 630. (Step 750).

Remapping the object 610 compensates for differences within the subject data set and the target data set. For example, if the subject data set and the target data set are based upon photographs taken at different distances, the data target data set and subject data set may have different coordinate locations based on their different scaling parameters; similarly datasets may be different in terms of translation or rotation. However, by remapping the object 610 to match the target object 630, as seen in FIG. 6, the differences based upon the photographic data used to create the subject data set and target data set are compensated for.

The processor 110 then determines a sphericity value for the mapped sphere 620 (i.e., if the original sphere is mapped to a non-similar simplex, it will become somewhat oblate; the sphericity metric evaluates how oblate the spheroid 620 has become due to the mapping operation). (Step 760). The more spherical the object 620 is after the remapping process the more likely that the subject will be identified as the target.

Sphericity is a metric that is used to determine whether two triangles, tetrahedra, or corresponding simplex solids in any dimensional space greater than three are geometrically similar.

When the objects 610 and 630 are tetrahedra, the sphericity of the resulting ellipsoid may be computed as:

$$S = \frac{(\det(g^t g))^{1/n}}{\frac{1}{n} tr(g^t g)}$$

Where:

$$B = \begin{bmatrix} x_1 & y_1 & z_1 & 1 \\ x_2 & y_2 & z_2 & 1 \\ x_3 & y_3 & z_3 & 1 \\ x_4 & y_4 & z_4 & 1 \end{bmatrix}$$

-continued

And:

$$g^t g = \begin{bmatrix} g_{11} & g_{12} & g_{13} \\ g_{21} & g_{22} & g_{23} \\ g_{31} & g_{32} & g_{33} \\ t_1 & t_2 & t_3 \end{bmatrix} = B^{-1} \begin{bmatrix} u_1 & v_1 & w_1 \\ u_2 & v_2 & w_2 \\ u_3 & v_3 & w_3 \\ u_4 & v_4 & w_4 \end{bmatrix}$$

Where $(x_n, y_n$ and $z_n)$ represent a point on the subject's face, $(u_n, v_n$ and $w_n)$ represent a point on a target's face, and $t_n$ represents a scaling factor.

When only a single photograph of the subject is available, the sphericity measurement may be accomplished with triangles. The sphericity is then computed as:

$$\text{Sphericity} = 2\frac{\sqrt{d_1 d_2}}{d_1 + d_2}$$

Where d1 and d2 are the minor and major axes of the inscribed ellipse. In this instance, the orientation of the target dataset should be optimized (i.e., adjusted to match the orientation of the subject in the single photograph) and rendered in two-dimensions in order to have target triangles to compare to.

The processor 110 may perform the sphericity comparison between multiple different multi-point objects within the subject data set and a target data set. That is, the processor 110 may create multiple objects 610 and multiple target objects 630 based upon the same subject data set and target data set and perform the sphericity measurement thereon. The processor 110 may then calculate a mean, median, or sum sphericity of all of the spheroids 620 and determine if there was a match if the mean, median, or sum sphericity is greater than a predetermined threshold. As discussed above, weighting factors may be applied to the sphericity to decrease the relative importance of points that are likely to vary most under different facial expressions. In one embodiment, for example, a weight assigned to an object 610 may be calculated as the product of the weights of the points that comprise it. In other embodiments, the weight of each object 610 may be equal to the weight of the point with the largest weight, the weight of the point with the smallest weight, or the mean, median, or sum of the points within the object 610.

The sphericity of the oblate spheroid 620 after the remapping may be compared to a predetermined threshold. If the sphericity of the spheroid 620 is greater than or equal to the predetermined threshold, the subject may be identified as the target. The predetermined threshold may very depending upon how many false-positive matches are willing to be tolerated. For example, the predetermined threshold would be higher if a single false identification for every one-hundred positive identifications is acceptable versus if one false identification for every ten identifications is acceptable.

The sphericity comparison can also be performed between a subject data set and multiple target data sets within the database 130. In one embodiment, the sphericity comparison can be performed between the subject and each target in the database 130. In another embodiment, a search algorithm can be used to determine the more likely matches. The processor 110 may analyze the data within the subject data set and, based upon an attribute of the subject's face, determine which target to compare with. For example, the target database may be organized in a tree structure, organizing the targets based upon their facial attributes. For example, people with large noses could be in one branch whereas people with small noses could be in another branch of the tree. The processor 110 may analyze the data within the subject data set and, based upon an attribute of the subject's face, determine which branch of targets to compare with the subject.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A facial recognition system, comprising:
   a memory configured to store a target data set identifying a plurality of predefined points on a face of a target; and
   a processor configured to:
      receive an arbitrary number of photographs including a face of a subject, each of the photographs taken from an arbitrary angle and at an arbitrary distance from the subject,
      create a subject data set identifying the plurality of predefined points on the subject's face based upon the received photographs,
      determine a bounding object based upon at least three points within the subject data set,
      determine a circular object within the bounding object which touches each side of the bounding object,
      remap the bounding object and the circular object therein such that the bounding object, corresponding to predefined points on the subject's face, matches an object corresponding to the same points in the target data set, and
      determine a sphericity of the remapped circular object.

2. The facial recognition system of claim 1, wherein the bounding object is a polyhedron.

3. The facial recognition system of claim 2, wherein the polyhedron is a tetrahedron and the circular object is a sphere.

4. The facial recognition system of claim 1, wherein the processor is further configured to determine if the sphericity of the remapped circular object is greater than a predetermined threshold.

5. The facial recognition system of claim 1, wherein the processor is further configured to choose a target data set to compare with the subject data set based upon an attribute of the subject data set.

6. The facial recognition system of claim 1, wherein the processor is further configured to compare the subject data set with a plurality of target data sets.

7. The facial recognition system of claim 1, wherein the bounding object is the first of a plurality of unique bounding objects, the circular object is the first of a plurality of circular objects, each circular object corresponding to one of the plurality of bounding objects, the remapped circular object is the first of a plurality of remapped circular objects, each remapped circular object related to one of the plurality of circular objects, and the processor is further configured to:
   determine a mean, median, and/or sum sphericity of the plurality of remapped circular objects.

8. A method for performing facial recognition, comprising:
receiving, by a processor, photographic data from an arbitrary number of photographs including a face of a subject, each of the photographs being at an arbitrary angle and at an arbitrary distance from the subject;
creating, by the processor, a subject data set identifying the plurality of predefined points on the subject's face based upon the received photographic data;
determining, by the processor, a bounding object based upon at least three points within the subject data corresponding to predefined points on the subject's face;
determining, by the processor, a circular object within the bounding object which touches each side of the bounding object;
remapping, by the processor, the bounding object and the circular object therein such that the bounding object, corresponding to predefined points on the subject's face, matches an object corresponding to the same points in a target data set stored in memory; and
determining, by the processor, a sphericity of the remapped circular object.

9. The method of claim 8, wherein the bounding object is a polyhedron.

10. The method of claim 8, wherein the polyhedron is a tetrahedron.

11. The method of claim 8, further comprising determining, by the processor, if the sphericity of the remapped circular object is greater than a predetermined threshold.

12. The method of claim 8, further comprising choosing, by the processor, a target data set stored in the memory based upon an attribute of the subject data set.

13. The method of claim 8, further comprising comparing, by the processor, the subject data set with a plurality of target data sets stored in the memory.

14. The method of claim 8, wherein the bounding object is the first of a plurality of unique bounding objects, the circular object is the first of a plurality of circular objects, each circular object corresponding to one of the plurality of bounding objects, the remapped circular object is the first of a plurality of remapped circular objects, each remapped circular object related to one of the plurality of circular objects, and the comparing further comprises:
determining, by the processor, a mean, median, and/or sum sphericity of the plurality of remapped circular objects.

15. An apparatus, comprising:
a camera configured to take at least one photograph of a target, the photograph being taken at any arbitrary angle relative to the subject and at any arbitrary distance from the subject;
a memory configured to store the at least one photograph and further configured to store a database including facial recognition data for at least one target identifying a predetermined number of points on the target's face; and
a processor configured to:
create a subject data set by analyzing the at least one photograph to determine the location of the predefined points on the subject's face,
determine a bounding object based upon at least three points within the subject data set corresponding to predefined points on the subject's face,
determine a circular object within the bounding object which touches each side of the bounding object,
remap the bounding object and the circular object therein such that the bounding object, corresponding to predefined points on the subject's face, matches an object corresponding to the same points in the target data set, and
determine a sphericity of the remapped circular object.

16. The apparatus of claim 15, wherein the bounding object is a polyhedron.

17. The apparatus of claim 16, wherein the polyhedron is a tetrahedron.

18. The apparatus of claim 15, wherein the processor is further configured to determine if the sphericity of the remapped circular object is greater than a predetermined threshold.

19. The apparatus of claim 15, wherein the processor is further configured to choose a target data set to compare with the subject data set based upon an attribute of the subject data set.

20. The apparatus of claim 15, wherein the processor is further configured to compare the subject data set with a plurality of target data sets.

21. The facial recognition system of claim 1, wherein the processor, when creating the subject data set, is further configured to:
extract pixel coordinates from each of the photographs corresponding to the plurality of predefined points on the subject's face;
determine camera parameters for the camera which acquired each photograph; and
generate the subject data set by triangulating each predefined point based upon a closest intersection point of camera rays passing thru the extracted pixels.

22. The facial recognition system of claim 21, wherein the processor, when creating the subject data set, is further configured to refine the subject data set by iteratively:
simultaneously determine camera parameters and three-dimensional point locations;
determine three-dimensional point locations the minimize aggregate image plane errors for all camera views; and
determine camera parameters that minimize an aggregate distance between input image points and derived three-dimensional face point data.

23. The facial recognition system of claim 7, wherein the processor is further configured to:
assign weight factors to the plurality of unique bounding objects based upon an expression on the subject's face; and
modify the spherocity of each of the remapped circular objects based upon the weight assigned to the related bounding objects.

24. The facial recognition system of claim 2, wherein the bounding object is a n-hedron having n number of dimensions and n is greater than or equal to two.

25. The facial recognition system of claim 24, wherein when only a single photograph of the subject is available, the bounding object is a 2-hedron, and the processor is further configured to:
orient the target data set to match the orientation of the face of the subject in the single photograph; and
render the target data set in two-dimensions.

* * * * *